United States Patent

[11] 3,604,492

| [72] | Inventor | Wolfgang Bayer |
| | | Eschen, Pons, Liechtenstein |
| [21] | Appl. No. | 826,906 |
| [22] | Filed | May 22, 1969 |
| [45] | Patented | Sept. 14, 1971 |
| [73] | Assignee | Hilti Aktiengesellschaft |
| | | Schaan, Furstentum, Liechtenstein |
| [32] | Priority | June 14, 1968 |
| [33] | | Germany |
| [31] | | H62999 |

[54] FASTENING ELEMENT
6 Claims, 2 Drawing Figs.

[52] U.S. Cl. .................................................. 151/41.73,
52/573, 52/701, 52/707, 85/10, 85/28, 248/361,
287/189.36
[51] Int. Cl. .................................................. E04b 1/38,
F16b 39/00
[50] Field of Search .......................................... 151/41.73,
41.7, 41.75, 69, 41.76, 37; 85/10 E, 10, 32 K, 71,
70; 52/701, 573, 700, 704, 707, 679, 376,
368–369, 361–363; 248/216, 71, 361, 206, 206 A,
158; 287/189.36 D

[56] References Cited
UNITED STATES PATENTS

| 1,884,491 | 10/1932 | Ziemann | 85/32 K UX |
| 2,048,093 | 7/1936 | Alpeters | 85/28 |
| 2,124,440 | 7/1938 | Tallberg | 85/9 X |
| 3,088,757 | 5/1963 | McIntosh | 151/41.7 X |
| 3,212,466 | 10/1965 | Wintersteen | 52/573 X |
| 3,455,199 | 7/1969 | Semanchik | 85/10 |

FOREIGN PATENTS

| 517,867 | 3/1953 | Belgium | 85/9 |
| 567,464 | 5/1958 | Belgium | 151/41.73 |
| 530,599 | 7/1931 | Germany | 248/71 |

*Primary Examiner*—Ramon S. Britts
*Attorney*—McGlew and Toren

ABSTRACT: A fastening element for the flexible fastening of a part to a base includes an anchoring element such as a nail which is adapted to be power driven into the base and a coupling part having detents at one end which engage around coupling detents of the nailhead and an opposite end which is secured to a nut. The nut provides a threaded receptacle for a threaded bolt which is adapted to bear either directly or through a washer upon the part to be fastened.

PATENTED SEP 14 1971

3,604,492

INVENTOR
WOLFGANG BAUER

BY McGlew and Toren
ATTORNEYS

3,604,492

FASTENING ELEMENT

SUMMARY OF THE INVENTION

This invention relates in general to anchoring devices, and in particular, to a new and useful multipart fastening element for the elastic fastening of a part to a base or foundation.

When fastening corrugated metal sheets such as aluminum sheets, it is sometimes necessary to fasten such sheets at the crest of the corrugation. Due to the expansion of the sheet metal when the temperature rises and due to its contraction when the temperature falls, this fastening mode exerts considerable bending forces on the fastening element. Similar problems also occur when fastening wooden planks which are exposed to climatic influences.

It is known when carrying out such fastening operations to use bolts, with an appropriately long threaded portion which is long enough to extend through the maximum wave height of the corrugation. Because of the action of the bending forces, it sometimes happens that the thread, because of its length, breaks in a vicinity of the base material or foundation. The same detrimental consequences occur with another known fastening element which comprises a nail having a short threaded portion which is driven into the base and a threaded bushing which can be screwed onto the threaded portion and which carries a threaded rod which can be screwed in the bushing. Such a design is particularly disadvantageous for the additional reason that the assembly of the components is complicated. It is also known to employ bolts having a shaft length corresponding to the height of the corrugation and such bolt is reinforced at its endangered section and equipped with a short threaded portion only. The fastening element is specifically designed so that it can absorb the occurring bending forces but its production is relatively expensive.

In accordance with the present invention, there is provided a fastening element which does not have the above-mentioned disadvantages and which includes a nail which is adapted to be driven into the base or foundation and which carries coupling detents or recesses for receiving one end of a coupling part such as a sheet metal part having another end which encompasses a nut. The nut threadably receives a machine screw. The machine screw has ahead which acts directly on the part to be connected or acts thereon through a washer which is interposed between the head and this part.

By using a coupling part which is interposed between the short nailhead and the machine screw there is produced an elastic connection rather than a rigid connection so that there is no stressing of the part by bending. Because of the flexible connection which is produced by the coupling part which acts as a joint the forces developing due to expansion and contraction of the material are transferred to the nail as tensile and shear forces. The nail may be stressed higher by these two types of stresses. In addition, it is particularly advantageous that commercial elements can be employed for all parts with the exception of the coupling part.

In accordance with another feature of the invention the coupling part comprises an intermediate part of one or more legs which are engaged at their one ends and extend around a threaded nut. The legs extend in an axial direction and their opposite ends are bent to engage with the head of the nail or an extension thereof. This coupling part, including one or more legs which engage around the head of the anchoring nail makes the flexible fastening of the parts possible because it will deform elastically under occurring loads. The nail part of the fastener may be formed with detents to receive the coupling part or the coupling detents may be preferably formed by an extension part comprising a cup-shaped member which is provided with an opening through which the securing nail extends. The cup-shaped part is such that a screw which protrudes into this part can be employed and when the coupling part is engaged the legs of the coupling part and the cup-shaped detent part are prevented from bending together by the bolt surface when a load is imposed on the legs.

Accordingly, it is an object of the invention to provide an improved device for the elastic fastening of a part to a base which includes an anchoring nail adapted to be driven into a securing foundation and which has a detent portion, and a coupling part secured to the detent portion and extending outwardly from the nail and carrying a threaded nut for threadably receiving a bolt part which is adapted to bear against the part to be held to the foundation.

A further object of the invention is to provide a fastening device which includes an anchoring nail which is adapted to be driven into the foundation and which carries detents either directly on its head thereof or on a cup extension which surrounds the head and which detents are adapted to engage with the bent ends of a coupling part carrying a threaded nut into which a holding bolt is adapted to be threaded, the holding bolt advantageously extending through the coupling part and preferably through the cup-shaped part having a detent and having a reinforcement therefrom.

A further object of the invention is to provide a fastening device which is simple in design, rugged in construction, and economical to manufacture.

The various features of novelty which characterize the invention are pointed out with particularity in the claims annexed to and forming a part of this specification.

For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
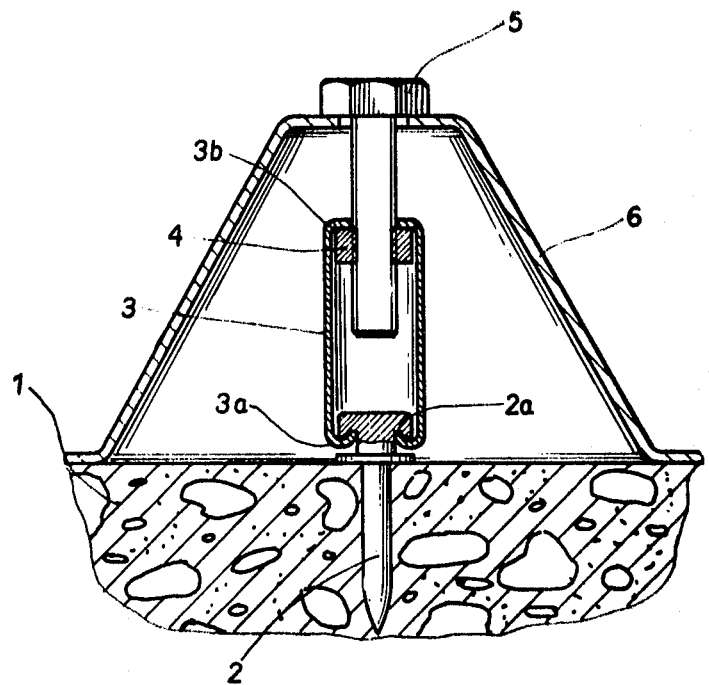
FIG. 1 is a partial longitudinal section through a corrugated sheet metal fastening having a fastening element constructed in accordance with the invention.

Referring to the drawings in particular, the invention embodied therein in FIG. 1, comprises an elastic fastening through a base such as concrete 1 which includes an anchoring device or nail 2 which is driven in to the concrete 1 and which has a head 20 with a flanged underside defining a groove 2a which runs around the underside of the head and defines a receiving detent into which the glanged ends or detents 3a, 3a of the legs of an intermediate part or coupling part 3 extend. The coupling part 3 includes opposite ends 3b, 3b which encompass a threaded nut 4 and which are secured to the nut such as by press fitting or by welding. A holding bolt or machine screw 5 is threaded into the nut 4 to the extent to cause its head to bear against the upper portion of the corrugations of a sheet metal 6.

Figure 2:
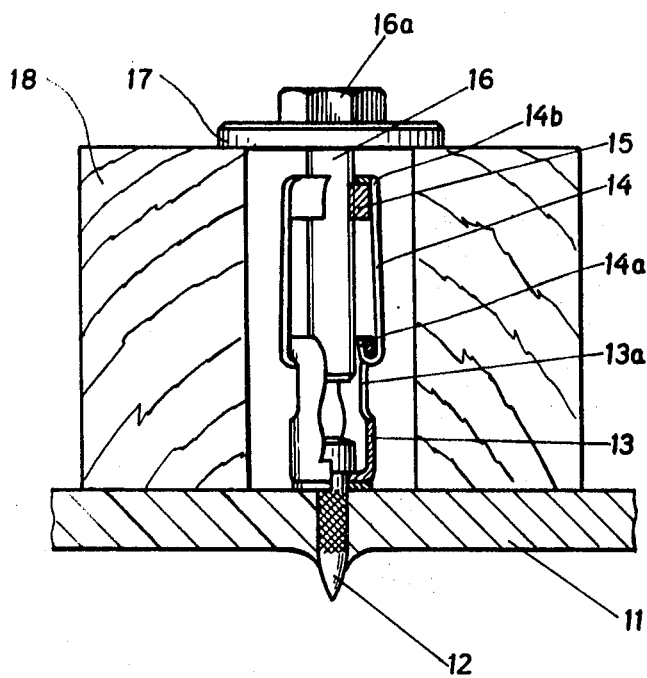
FIG. 2 is a view similar to FIG. 1 of another embodiment of the invention.

In the embodiment indicated in FIG. 2, there is shown a flexible fastening assembly for securing a part to a base which comprises for example a metal 11. A nail 12 is secured to the base 11 such as by driving it into the base with a power-driven setting tool. Before driving, the nail is engaged into a receiving bore of a cup-shaped part 13 and the nail is driven in to the extent that the part 13 is held by the nailhead 20' against a washer 22. The cup-shaped part 13 forms an extension or detent means in the form of cross holes 13a which receives bent ends 14a, 14a of a coupling part 14. The opposite ends 14b, 14b of the coupling part 14 encompass a threaded nut 15 into which a machine screw or bolt 16 is screwed. The machine screw has a head portion 16a which acts upon on a wooden plank 18 by bearing through a washer 17. To prevent the leg ends 14a, 14a from bending apart under heavy load the length of a screw 16 is choosen so that it stands between the end pieces of the leg and ends of the cup-shaped part 13 and of the intermediate part 14 so that the leg ends can support themselves against the shaft of the screw 16.

What is claimed is:

1. A multipart fastening element for the flexible fastening of a part to a base comprising a nail which is adapted to be driven into the base and having a portion defining coupling detent means, a coupling part extending outwardly from said nail and articulated to said detent means said coupling part including an end opposite from said nail carrying a threaded nut, and a machine screw threaded into said nut in a direction parallel to the axis of said nail and having a head portion adapted to bear against the parts to be fastened.

2. A multipart fastening element for the flexible fastening of a part to a base comprising a nail which is adapted to be driven into the base and having a portion defining coupling detent means, a coupling part extending outwardly from said nail and engageable with said detent means, said coupling part including an end opposite from said nail carrying a threaded nut, and a machine screw threaded into said nut and having head portion adapted to bear against the parts to be fastened, said coupling part including at least two leg portions extending from said nut to said nail, said leg portions having flanged ends engageable with said detent means and permitting relative movement of said coupling part and said nail.

3. A multipart fastening element, according to claim 2, wherein said nail has a head and said detent means comprises said nailhead having an annular groove therearound, said coupling part including bent end portions which engage within a groove of said nailhead.

4. A multipart fastening element for the flexible fastening of a part to a base comprising a nail which is adapted to be driven into the base and having a portion defining coupling detent means, a coupling part extending outwardly from said nail and engageable with said detent means, said coupling part including an end opposite from said nail carrying a threaded nut, a machine screw threaded into said nut and having a head portion adapted to bear against the parts to be fastened, said detent means including a separate cup-shaped member held by said nail, and interengaging means connecting said cup-shaped member with said coupling part.

5. A multipart fastening element for the flexible fastening of a part to a base comprising a nail which is adapted to be driven into the base and having a portion defining coupling detent means, a coupling part extending outwardly from said nail and engageable with said detent means, said coupling part including a end opposite from said nail carrying a threaded nut, and a machine screw threaded into said nut and having a head portion adapted to bear against the parts to be fastened, said detent means comprising a cup-shaped member having a central bore therethrough, said nail having a shaft portion extending through said bore and a head portion resting against said cup-shaped member, said detent means including a opening in said cup-shaped member, said coupling part having an end engaged within the opening of said cup-shaped member.

6. A multipart fastening element, according to claim 5, wherein said machine screw includes a long shank portion extending through said coupling part and into said cup-shaped member and forming a reinforcement therefor.